Sept. 29, 1931.　　　　J. W. MARTIN, JR　　　　1,825,647

STORAGE, TRANSPORTATION, AND DISTRIBUTION OF FROZEN CARBON DIOXIDE

Filed Nov. 22, 1927

Inventor
James W. Martin, Jr.
By his Attorney

Patented Sept. 29, 1931

1,825,647

UNITED STATES PATENT OFFICE

JAMES W. MARTIN, JR., OF YONKERS, NEW YORK, ASSIGNOR, BY MESNE ASSIGNMENTS, TO DRYICE EQUIPMENT CORPORATION, OF NEW YORK, N. Y., A CORPORATION OF DELAWARE

STORAGE, TRANSPORTATION, AND DISTRIBUTION OF FROZEN CARBON DIOXIDE

Application filed November 22, 1927. Serial No. 235,044.

My present invention relates to the storage, transportation, distribution and use of frozen carbon dioxide in the form of dense cakes.

Frozen carbon dioxide has long been known as a product that can be produced from liquid carbon dioxide by releasing it from critical temperature and pressure of liquefaction, as by free jet discharge. Such release of pressure permits instant gasification, and the sudden expansion causes an enormous reduction in temperature, with the result that part of the carbon dioxide freezes in snow-like crystals that melt at approximately 110° F. below zero. This snow may be compressed into dense sticks, sheets, blocks or cakes of any desired size or shape. More recently the snow has been produced by improved methods; also the cakes have been produced by direct freezing of the liquid while subjecting it to heavy follow-up pressure.

Although the liquid carbon dioxide cannot exist as such at atmospheric temperature and pressure, the frozen product is a staple commodity which, as is well known, melts or, rather, sublimates directly to gas at rates which are surprisingly slow, considering the enormous difference in temperature between the frozen carbon dioxide, say 110° F. below zero, and normal atmosphere, at say, 60° F. above zero. Because the carbon dioxide molecule ($CO_2$) is intrinsically much heavier than either the oxygen or nitrogen of the air, and because of its very low temperature, the gas evolved from the solid carbon dioxide is almost twice as heavy as air at ordinary temperature. Consequently, the gas readily displaces air, tends to remain in the bottom of the receptacle and will diffuse but slowly.

While recognizing the above inherent qualities and functionings of carbon dioxide, my present invention relates more particularly to the discovery as well as the solution of certain practical difficulties attendant upon storage, transportation, distribution and use of solid carbon dioxide on a large quantity commercial basis. I have discovered that under present day conditions, where the solid carbon dioxide is turned out at the factory at the rate of many tons per day, the actual marketing and using of the product discloses unexpected difficulties and problems related to but quite different from mere heat insulation. Some of these will be more evident from considering an illustrative case where the cakes are turned out in 10 inch cubes, each weighing approximately forty pounds, it being understood that the same considerations apply to cakes of other standard shapes, sizes or weights.

For storage and distribution, these cakes are commonly placed in receptacles or boxes of design and material adapted for keeping the cakes well insulated from exterior heat, thick-walled balsa wood boxes being commonly employed for this purpose. Economy of box cost and weight, as well as effectiveness of protection of the solid carbon dioxide, requires that the boxes be of relatively large size, and preferably tending toward the proportions of a cube, both factors operating to reduce the box wall area per unit volume of solid carbon dioxide within the box. Hence, a large number of cakes or cubes will be packed in a single box, and, naturally, they are piled several cakes deep, common arrangements being, say, 10 inch cubes, in two or three layers of 9 or more cubes each.

It is, of course, obvious that the better the heat insulation afforded by the box, the less solid will be lost by evaporation, but an important feature of my invention concerns another aspect of the matter, namely, regulating the nature and distribution of the evaporation in such a way as best to preserve a more standard shape and surface for the unevaporated part of the cakes. Impairment of these characteristics is to be distinguished from the amount or rate of the evaporative loss.

For instance, in the case of the three layers of 10 inch blocks piled in a balsa wood box, I have discovered that there is irregular erosion of the vertical surfaces of all cakes and selective melting of the upper cakes much faster than the lower cakes, whereby the upper cakes become pyramidal in shape and their surface erosion is very irregular. I have discovered that this is due first to a general thermocirculation of air and gas within the box, upward along the inner surface of the box and downward between cakes at the center and second to a localized eddy circulation at the top of the box. The higher the pile of blocks the worse the surface erosions and the more quickly and completely the upper blocks lose the shape and appearance of a standardized article of commerce. This occurs to some extent even when the atmosphere is pure carbon dioxide gas, but in practice some air is present and, being much lighter than carbon dioxide gas, tends to collect in the top of the box. As a result, the top portions of the top cubes are caused to suffer most from evaporation and they quickly evaporate toward pyramid form, spoiling the standard rectangular shape of the cake. Thus, the top evaporation and the interior down-current erosion of surfaces seriously impair the value of the commodity for delivery to consumers who expect a standard approximately rectangular shape and the market value, particularly of the top cakes, is depreciated by a loss of shape as distinct from the loss of weight.

A similar but even more rapid selective erosion of the block, reducing it to pyramidal shape, results where the block is exposed to the open air.

As a result of careful study of this phenomena, I have discovered that the acceleration of erosion at the top is dependent on at least two factors, to which allusion has been made.

First, the higher the stack of blocks, the greater will be the vertical height of the thermo-circulation of gas adjacent to the surface of the solid carbon dioxide, the greater will be the difference in temperature between the bottom and the top of the circulation, and the more rapid is the general circulation upward along the exterior and downward in the middle.

Second, it is almost impossible to avoid the presence of air in a large container and, as concerns air effects, solid carbon dioxide is totally different from water ice or any other substance with which I am familiar. On solid carbon dioxide, air or any given percentage thereof, has substantially the same effect that the same percentage of vacuum would have in accelerating the evaporation and reducing the sensible temperature of the solid and the gas that comes therefrom. For instance, in the case of solid carbon dioxide in contact with approximately pure carbon dioxide gas, the temperature may be above its freezing point, or, say, 109° F. below zero, but contact of pure air with the solid will produce an effect like that of a vacuum, the evaporation being accelerated and the temperature dropped to, say, 140° F. below zero. The effect of this is to evolve cold gas, which streams down the surface of the block, substantially decreasing the evaporation from the lower portion of the block, but causing such evaporation as occurs to appear as more or less irregular erosion of the vertical surfaces and spoiling of the shape and appearance of the blocks, particularly those nearer the top of the stack. Moreover, the vacuum-like effect of the air lowers the internal temperature of the box some thirty or forty degrees, thereby increasing the temperature drop between the exterior and the interior of the box, increasing the rate and amount of inward conduction of heat, increasing the total losses of the solid carbon dioxide.

It will be evident that these phenomena result in very serious money-value losses where such cakes have become a commercialized commodity and the public has been led to expect standard shapes and surface appearances. The irregular shapes are particularly objectionable where, as is frequently the case, the contemplated use involves subdividing the blocks into special sizes and shapes required for special commercial uses.

While it will be evident that these effects might be minimized by the use of more or better insulating material, I have discovered that satisfactory preservation of standard shape and appearance can be attained by shielding the surfaces of the blocks from contact with the general thermo-circulation in the storage chamber or by subdividing the space so as to minimize or prevent such general circulation; and this regardless of whether the shielding or subdividing means is or is not important as a non-conductor of heat. Paper so thin as to be of almost negligible value as a non-conducting material may be used either to subdivide the space and prevent general circulation, or it may be employed as a wrapper, each wrapper enclosing one or more individual blocks. A simple but extremely effective expedient is to enclose each cake in a paper bag with the mouth folded over, preferably uppermost, so that such gas as is evolved within the bag will force out air from the top. With this arrangement, each block is completely shielded from erosion by general thermo-circulation in the box and such circulation is itself greatly diminished because the paper more or less fills the interspaces between blocks. Within the bag, the block is surrounded by pure dry carbon dioxide gas, which can have only a very feeble convection circulation localized within the bag. Moreover, it serves as most effective insulation and such heat as is conducted through the paper envelope is applied non-erosively and uniformly so that the block in evaporating down preserves for a long time an uneroded surface and a shape near enough rectangular to be entirely commercial. Moreover, there is very little tendency to selective preservation of shape of the bottom blocks, all blocks melting to much more nearly the same size and shape and presenting to the consumer appearances sufficiently identical to give the impression of a standardized product.

Such bagging of the individual blocks is also a great practical advantage when blocks are to be transferred from storage to a transportation package or truck, or when single cakes are removed from the latter and transferred to the consumers. The bag necessarily goes into a receptacle that has a fresh supply of air admitted with the bag, but such air is kept from contact with the solid carbon dioxide by the bag, and however warm it may be, such air can have no vacuum-like effect to accelerate evaporation of the solid. Furthermore, a bare block exposed to the atmosphere instantly begins to condense moisture from the air, part of which goes into carbonic acid solution, liberating heat, and this moisture, as well as subsequent accumulations, freezes, liberating still more heat. This not only uses up the solid, but it contaminates it for many purposes for which it is commonly used. For instance, if the solid is charged into a container for the purpose of having it melt back to liquid carbon dioxide under pressure, as in my Patent No. 1,760,953 the resulting liquid will contain water, and this may be in a case where the whole object was to get pure liquid carbon dioxide, perfectly free from water.

The above and other objects of my invention will be more evident from the following description in connection with the accompanying drawings, in which Fig. 1 is a perspective view of a block of solid carbon dioxide enclosed in a paper bag in accordance with my invention, parts of the bag being broken away.

Figure 1:
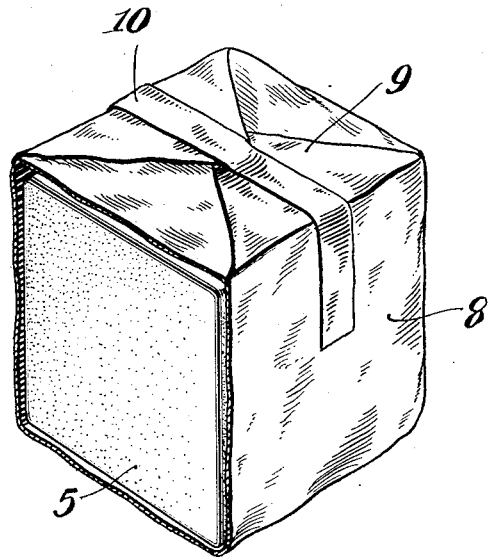
Figure 2:
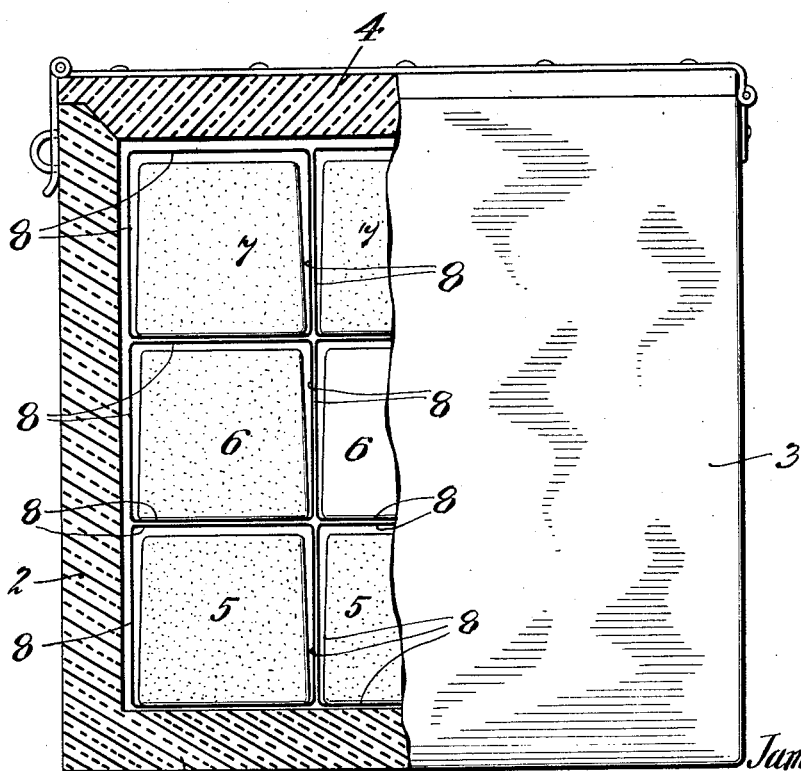
Fig. 2 is a view showing an insulating storage case, broken away to vertical section to shown superposed cakes of solid carbon dioxide therein.

In Fig. 2, the storage box is shown as comprising a bottom 1, sides 2, 3, and cover 4 of insulating material, preferably balsa wood. Within the box are the parallel stacks of blocks comprising the lower blocks 5, 5, superposed blocks 6, 6 and top blocks, 7, 7. Each of these blocks is diagrammatically indicated as being enclosed in a separate paper bag 8, 8, 8, etc. In this figure, the paper bags are entirely diagrammatic on account of the difficulties of illustration, but it will be understood that they are like the bag 8 enclosing the block 5 as in Fig. 1. In this figure, the top 9 of the bag is shown as folded over and the flaps secured by a paster 10.

Fig. 2 is chiefly useful as showing how, when enclosed in paper bags, the bottom block 5 and the superposed blocks 6 and 7 tend to evaporate, each of them slightly more at the top than the bottom, but all of them to approximately the same exent.

Figure 3:
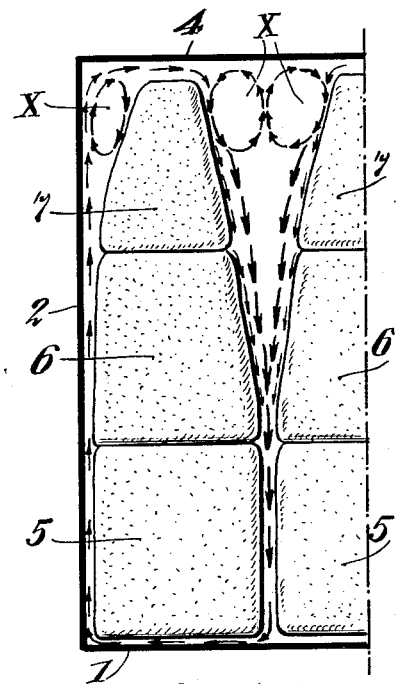
Fig. 3 is a diagrammatic view indicating the tendency to general convection or thermocirculation in the storage chamber as well as eddy tendencies and erosion near the top of a stack of blocks of solid carbon dioxide.

As contrasted with this, Fig. 3 indicates the general thermo-circulation and local eddy tendencies in the storage chamber, the bottom 1, sides 2, and top 4 being diagrammatically indicated and the blocks 6 and 7 superposed on the block 5, being shown without any paper bag covering because the circulation tendencies are similar to and illustrate the tendencies in Fig. 2 where the bags are employed. In Fig. 3, the upper blocks 7, where most of the air is, are subjected to the general circulation between top and bottom of the chamber, as indicated by the vertical lines of arrows and also to the eddy tendencies I have tried to indicate at $x$.

It will be evident that even if all of the atmosphere within the storage chamber were pure carbon dioxide, the circuits of the convection currents would be downward in the inside vertical passages adjacent the inside faces of the blocks and upward adjacent the chamber walls 2, with the result that even in this case the up-going warmer gas would be the first to impinge on the topmost portion of the top block 7 and said block would be eroded selectively though not to the same extent indicated in Fig. 3. However, as before explained, substantial quantities of air are from time to time admitted within the box and are seldom wholly eliminated. Consequently, there tends to be an accelerated circulation at $x$, which is rich in air and has the above described accelerating effect on the evaporation of the solid carbon dioxide tending to rapidly evaporate the upper block toward a pyramid. This view is also intended to show that such effect of the air, accelerating the evaporation, much as a vacuum would do, reduces the temperature far below 110° F. below zero and the off-coming pure carbon dioxide gas may reach a temperature as low as 140° F. below zero or less. The view is intended to show that such intensely cold gas, seeking the bottom of the container, evaporates the second block 6 somewhat and the bottom block 5 still less. However, the irregularity or surface erosion effects may be very serious even on the lower block. It will be evident that even at the stage indicated in Fig. 3, the upper block 7 has been destandardized as to shape as well as size and even if skilled operatives were at hand to split the remnant to a cube or other rectangular form, there would be much waste and the remnants from different blocks would not be the same. When the erosion has proceeded beyond the point indicated in Fig. 3, conditions are still worse.

As contrasted with this, the erosion of each cake 5, 6, 7, when enclosed in a paper bag, is only that which can be caused by practically pure carbon dioxide gas having only a very local sluggish circulation because the top to bottom circulation is individual for each of the cakes. Consequently, though each block may decrease in volume and have its sides somewhat sloped in toward the top and its corners and edges somewhat rounded, nevertheless these changes will be relatively slight, and will be substantially the same for all of the blocks, regardless of their level in the refrigerating container.

The paper bags or wrappers tend to fill all the spaces between the blocks, both originally and when the blocks are decreased in size by evaporation losses, thereby greatly impeding or preventing the general thermo-circulation in the storage chamber. As the blocks shrink, the stacks naturally settle, but the paper wrappers being continuously subject to an expansive tendency of the gas from the evaporating solid carbon dioxide naturally tend to keep lateral contact and throttle the exterior circulation.

While I have described the block and the bag containing it as being rectangular, and preferably cubical, it will be evident that there are many other specific shapes and proportions which may be used in the practice of my invention, with the above described advantages.

While I prefer a substantial, well made paper bag, with only a mouth closure as described, it will be evident that so far as concerns shielding the blocks from the convection currents, any paper wrapper sufficiently enclosing the same individually will effect some of the main purposes of my invention.

The principles of my method will also be employed where the individual containers for the blocks are of substantial construction and even where the interior of the box is made cellular by partitions and separating the boards which may be of pasteboard or the like.

However, there seems to be nothing that serves the purpose as well as a bag or wrapper that is of relatively thin, flexible, but relatively non-resilient material constructed so as to permit slow exit of gas in response to moderate internal pressure. Such material, particularly wrapping paper, naturally tends to maintain its full size and shape as the cake melts, due to a slight outward pressure afforded by the gas continuously evolved within it. This tends to keep the block insulated by a maximum thickness of the insulating gas within the bag and at the same time to keep spaces between packages at a minimum, thereby throttling general convection circulation throughout the storage container. Thus, it is unlike any pasteboard or other rigid or semi-rigid insulating container, in that its large, flexible pressure areas yield inward under external pressure but only resiliently, the slight internal pressure of the continuously evolved gas tending to support or even expand such portions of the area as are not subjected to the external pressure.

In many cases it will be found that glazed paper or oiled paper or oiled silk, affording a bag or wrapper relatively impervious to oozing of gas through the material, will make it easy to increase resistance to vent of the gas and thus substantially increase the expansive pressure of gas maintained within the bag and this is sometimes desirable, but it is also possible to have a mechanically tight envelope having no physical vent, made of material sufficiently permeable to permit outward oozing of the gas at a desired slow rate.

I claim:

1. The method of storage, transportation and distribution of frozen carbon dioxide which includes forming the same to solid blocks of predetermined size, shape and weight, packing the blocks in close arrangement in superposed layers in a suitable insulating container and decreasing evaporation and erosion losses by protecting each individual block from the natural thermo-convection currents set up within the container and protecting the non-contacting surface of each block and the top of the uppermost block in each column from moisture and frost by enclosing each block in a flexible container formed of flexible paper-like material, that is adapted to settle vertically while maintaining lateral expansion as the blocks decrease in size due to evaporation, whereby the protecting gas insulating within each of the containers for the block is maintained as the block diminishes in size.

2. The method of storage, transportation and distribution of frozen carbon dioxide which includes forming the same to solid blocks of standard size, shape and weight, packing the blocks in close arrangement in superposed layers in a suitable insulating container and decreasing evaporation and erosion losses by protecting blocks of the topmost layer both from moisture and the air in the natural thermo convection currents set up within the container, by enclosing each block of said layer in a flexible container of paper like material of a quality adapted to substantially oppose outflow of gas therethrough whereby the block and container therefor will settle vertically while maintaining lateral expansion, as evaporation decreases the sizes of the blocks.

3. The method of storage, transportation and distribution of frozen carbon dioxide which includes forming the same to solid blocks of standard size, shape and weight, packing the blocks in close arrangement in superposed layers in a suitable insulating container and decreasing evaporation and erosion losses by protecting each individual block from the natural thermo convection currents set up within the container by enclosing each block in a flexible paper-like container of texture adapted to settle vertically while maintaining lateral expansion, as evaporation decreases the sizes of the blocks, whereby the thickness of the protecting gas insulation within each of the individual containers from the blocks increases as the block diminishes in size.

4. A storage or transportation package, comprising an insulating container having superposed layers of packages therein, each package comprising a rectangular block of frozen carbon dioxide enclosed in a rectangular paper bag having its mouth folded in flaps, secured across the top of the package so as to prevent inlet of air, while permitting escape of the carbon dioxide gas as the block sublimates.

5. A storage or transportation package, comprising an insulating container having superposed layers of packages therein, each package comprising a block of frozen carbon dioxide enclosed in a paper bag so as to prevent inlet of air, while permitting escape of the carbon dioxide gas as the block sublimates.

6. A storage or transportation package, comprising a rectangular insulating container having packed therein layers of rectangular packages, substantially fitting the same, each package comprising a rectangular block of frozen carbon dioxide enclosed in a rectangular paper bag approximately fitting the block and having flaps secured across the top of the package so as to prevent inlet of air, while permitting escape of the carbon dioxide gas as the block sublimates.

7. An insulating container adapted for storage or transportation purposes, having therein superposed layers of standardized rectangular blocks of frozen carbon dioxide, in combination with means for protecting all the blocks from moisture and for shielding the topmost blocks from the general convection currents set up within the container.

8. An insulating container adapted for storage or transportation purposes, having therein superposed layers of standardized rectangular blocks of frozen carbon dioxide, in combination with means for protecting all the blocks from moisture and for shielding each individual block from the general convection currents set up within the container.

9. An insulating container adapted for storage or transportation purposes, having therein superposed layers of blocks of frozen carbon dioxide, in combination with means for protecting all the blocks from moisture and for shielding each individual block from the general convection currents set up within the container.

10. An insulating container adapted for storage or transportation purposes, having therein superposed layers of blocks of frozen carbon dioxide, in combination with means for shielding each individual clock from the general convection currents set up within the container, said means including a paper-covering for each block, the covering being of a texture adapted to exclude moisture and to afford substantial resistance to outflow of gas.

Signed at New York city in the county of New York, and State of New York, this 19th day of November, A. D. 1927.

JAMES W. MARTIN, Jr.